United States Patent
Murakawa

Patent Number: 6,025,291
Date of Patent: Feb. 15, 2000

[54] DIELECTRIC CERAMIC COMPOSITION AND DIELECTRIC RESONATOR USING THE SAME

[75] Inventor: Shunichi Murakawa, Kokubu, Japan

[73] Assignee: Kyocera Corporation, Kyoto, Japan

[21] Appl. No.: 09/194,666

[22] PCT Filed: Apr. 2, 1998

[86] PCT No.: PCT/JP98/01512

§ 371 Date: Dec. 1, 1998

§ 102(e) Date: Dec. 1, 1998

[87] PCT Pub. No.: WO98/43924

PCT Pub. Date: Oct. 8, 1998

[30] Foreign Application Priority Data

Apr. 2, 1997 [JP] Japan ................. P09-083656
Jun. 27, 1997 [JP] Japan ................. P09-172576

[51] Int. Cl.[7] ................ C04B 35/46; C04B 35/50; H01B 3/12
[52] U.S. Cl. .................... 501/136; 333/219.1; 361/321.5
[58] Field of Search .............. 501/136; 333/219.1; 361/321.5

[56] References Cited

U.S. PATENT DOCUMENTS 4,309,295  1/1982  McSweeny ............... 252/62.3 BT
4,547,314  10/1985  Masuyama et al. ............ 252/520
5,356,844  10/1994  Hirahara et al. ............... 501/136

FOREIGN PATENT DOCUMENTS 62-297260  12/1987  Japan ................ C04B 35/46
63-292508  11/1988  Japan ................ H01B 3/00
3261653  11/1991  Japan ................ C04B 35/46
8077829  3/1996  Japan ................ H01B 3/12

*Primary Examiner*—David Brunsman
*Attorney, Agent, or Firm*—Loeb & Loeb, LLP

[57] ABSTRACT

The present invention provides a dielectric ceramic composition having a high dielectric constant and a high Q value in high frequency ranges, and also having a temperature coefficient $\tau_f$ of resonance frequency capable of being controlled stably in a small range. The dielectric ceramic composition contains at least lanthanide Ln, Al, Sr and Ti as metal elements, and has a composition for the metal elements, represented by the composition formula of $aLn_2O_x \cdot bAl_2O_3 \cdot cSrO \cdot dTiO_2$, wherein a, b, c, d and x are confined as follows in mole ratio: $0.2194 < a \leq 0.4500$, $0.2194 < b \leq 0.4500$, $0.1000 \leq c \leq 0.4610$, $0.1000 \leq d \leq 0.4610$, $3 \leq x \leq 4$, and $a+b+c+d=1$.

4 Claims, 1 Drawing Sheet

DIELECTRIC CERAMIC COMPOSITION AND DIELECTRIC RESONATOR USING THE SAME

FIELD OF THE INVENTION

The present invention relates to a dielectric ceramic composition having a high Q value in high frequency ranges of microwaves and millimeter waves.

BACKGROUND OF THE INVENTION

Dielectric ceramics has been widely used as dielectric resonators, MIC-use dielectric substrates and waveguides in high frequency ranges of microwaves, millimeter waves and the like. For such uses, the ceramics is required to have the following characteristics;

1) A high dielectric constant $\in_r$ to meet the needs for miniaturization of devices as a wavelength in a dielectric material having a dielectric constant $\in_r$ is shortened to $1/\in_r^{1/2}$ times that in vacuum;

2) A low dielectric loss at high frequencies, that is, high Q value; and,

3) A small change $\Delta f/\Delta T$ ($=\tau_f$) in resonance frequency f with respect to temperature T, that is, low dependence and high stability of the dielectric constant with respect to temperature.

Oxide ceramic materials, such as $BaO-TiO_2$ based materials, $BaO-REO-TiO_2$ based materials (REO stands for a rare-earth metal oxide) and $MgTiO_3-CaTiO_3$ based materials, have been known as this kind of dielectric ceramics (refer to Japanese Patent Publication JP-61-10806A, Japanese Patent Publication JP-63-100058A and Japanese Patent Publication JP-60-19603A, for example).

Although the $BaO-TiO_2$ based materials have a dielectric constant $\in_r$ in the range of 37 to 40 and a high Q value of about 40000, it has been impossible to obtain a single-phase material having a very nearly zero temperature dependence $\tau_f$ of resonance frequency. Furthermore, the dielectric constant of such a single-phase material changes significantly with a change in composition, and also the dielectric constant thereof also changes significantly with temperature. Therefore, it has been difficult to control the composition to obtain a low temperature coefficient $\tau_f$ of resonance frequency in the state where the dielectric constant is maintained high and where the dielectric loss is maintained low.

In addition, regarding the $BaO-REO-TiO_2$-based materials, $BaO-Nd_2O_3-TiO_2$-based and $BaO-Sm_2O_3-TiO_2$-based materials have been known, and it has been possible to obtain materials having a very high dielectric constant $\in_r$ in the range of 40 to 60, and a temperature coefficient $\tau_f$ of resonance frequency of 0 (zero). However, these materials have a small Q value of 5000 or less.

Furthermore, in the case of the $MgTiO_3-CaTiO_3$-based materials, it has been possible to obtain materials having a high Q value of 30000, and a temperature coefficient $\tau_f$ of resonance frequency of 0 (zero). However, these materials have a small dielectric constant in the range of 16 to 25.

As described above, any of the above-mentioned materials dose not sufficiently satisfy the above-mentioned three characteristics required for high-frequency dielectric materials.

DISCLOSURE OF THE INVENTION

In view of the above-mentioned disadvantages, an object of the present invention is to provide a dielectric ceramic composition having a high dielectric constant, a high Q value and a small and stable temperature dependence of dielectric constant.

Another object of the present invention is to provide a dielectric ceramic resonator having a high Q value, a small and stable temperature dependence of dielectric constant and high frequency stability.

In order to attain the objects, the dielectric ceramic composition of the present invention contains at least lanthanide element Ln, Al, Sr and Ti as metal elements and is formed of a $Ln_2O_x-Al_2O_3-SrO-TiO_2$ based ceramics. In the present invention, the dielectric ceramics of the present invention has a two-phased structure comprising a $Ln_2O_x-Al_2O_3$ phase and a $SrO-TiO_2$ phase, and may probably include perovskite type crystals. By adjusting the composition of the ceramics containing components $Ln_2O_x$, $Al_2O_3$, SrO and $TiO_2$, this dielectric ceramic composition can have a high dielectric constant, a high Q value, a low temperature dependence of dielectric constant and high stability of resonance frequency.

In particular, the dielectric ceramic composition of the present invention is based on the above-mentioned $Ln_2O_x-Al_2O_3-SrO-TiO_2$-based ceramics, and further contains $MnO_2$ preferably, thereby to improve the above-mentioned characteristics.

BEST MODE FOR CARRYING OUT THE INVENTION

Figure 1:
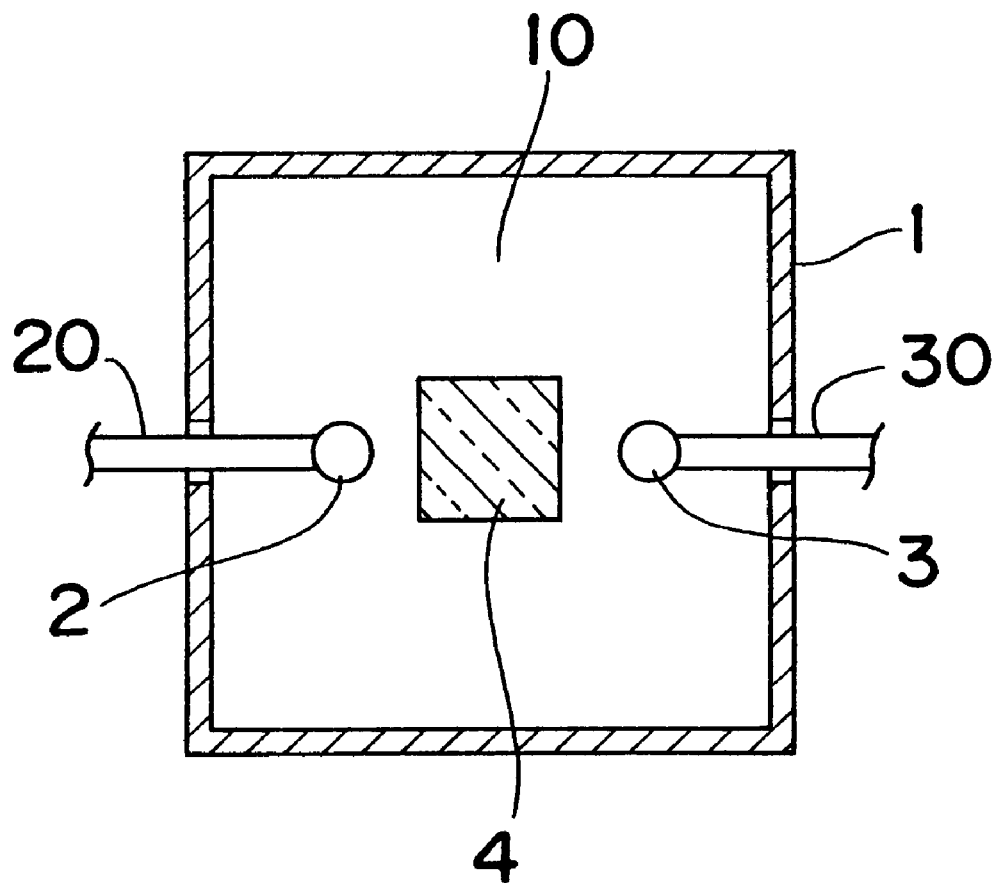
FIG. 1 is a schematic sectional view showing a dielectric resonator used as an application example of the dielectric ceramic composition of the present invention.

The dielectric ceramic composition of the present invention is represented by the following formula.

$$\text{General formula: } aLn_2O_x \cdot bAl_2O_3 \cdot cSrO \cdot dTiO_2 \tag{1}$$

In the formula (1), a, b, c, d and x are confined as follows in mole ratio:

$0.2194 < a \leq 0.4500$;

$0.2194 < b \leq 0.4500$;

$0.1000 \leq c \leq 0.4610$;

$0.1000 \leq d \leq 0.4610$;

$3 \leq x \leq 4$; and $a+b+c+d=1$

Content a of $Ln_2O_x$ in the composition is confined in the range of $0.2194 < a \leq 0.4500$. In the case of $a \leq 0.2194$, the temperature coefficient $\tau_f$ (ppm/° C.) of resonance frequency of the dielectric ceramics becomes positively larger, and the absolute value of $\tau_f$ far exceeds 30 ppm/° C. (corresponding to 30 kHz/° C. at 1 GHz). On the other hand, in the case of $a > 0.4500$, the dielectric constant of the ceramics drops, the Q value decreases to less than 20000, $\tau_f$ becomes negatively lager, and its absolute value exceeds 30 ppm/° C. In particular, the content a of $Ln_2O_x$ should preferably be in the range of $0.2200 \leq a \leq 0.3250$.

The content b of $Al_2O_3$ is confined in the range of $0.2194 < b \leq 0.4500$. In the case of $b < 0.2194$, the Q value decreases to less than 20000, and in the case of $b > 0.4500$, the Q value also decreases to less than 20000. In particular, the content b of $Al_2O_3$ should preferably be in the range of $0.2200 \leq b \leq 0.3250$.

The content c of SrO is confined in the range of $0.1000 \leq c \leq 0.4610$. In the case of $c < 0.1000$, $\tau_f$ becomes negatively larger, and its absolute value exceeds 30 ppm/° C.

In the case of c>0.4610, $\tau_f$ becomes positively larger, and its absolute value exceeds 30 ppm/° C. In particular, the content c should preferably be in the range of 0.2500≦c≦0.4000.

Furthermore, the content d of $TiO_2$ is confined in the range of 0.1000≦d≦0.4610. In the case of d<0.1000, $\tau_f$ becomes negatively larger, its absolute value exceeds 30 ppm/° C., and $\tau_r$ becomes 20 or less. In the case of d>0.4610, $\tau_f$ becomes positively larger, its absolute value exceeds 30 ppm/° C. and the Q value becomes less than 20000. In particular, the content c should preferably be in the range of 0.2500≦d≦0.4000.

A lanthanide oxide is represented by $Ln_2O_x$ (3≦x≦4), and the lanthanide element Ln can preferably be selected from among La, Nd, Ce, Pr, Sm, Eu, Gd, Dy, Er and Yb. Among these elements, La can be used most favorably. Furthermore, two or more kinds of lanthanide elements Ln may be added.

In the above-mentioned composition formula (1), the total of the molar contents of a lanthanide oxide $Ln_2O_x$ and other three components ($Al_2O_3$, SrO and $TiO_2$), used as the major components, that is, a+b+c+d, is assumed to be one mole. In addition, inevitable impurities other than the above-mentioned major components may be included in the composition of the present invention.

In particular, the present invention may further include Mn of not more than 7.0 parts by weight in terms of $MnO_2$ to 100 parts by weight of the major components which are represented by the above-mentioned formula (1) as the major components.

Namely, the addition of Mn to the above-mentioned major components can increase only the Q value without changing $\in_r$ and $\tau_f$. In addition, the content of Mn should not be more than 7.0 parts by weight of Mn in terms of $MnO_2$, because if the content exceeds 7.0 parts by weight, the Q value is smaller extremely and $\tau_f$ is shifted to the positive side. Furthermore, to obtain the above-mentioned effects, the content of Mn should preferably be 0.01 part or more by weight in terms of $MnO_2$.

The dielectric ceramic composition of the present invention is provided and used as sintered oxide ceramics having the above-mentioned composition.

To obtain the dielectric ceramic composition of the present invention, oxides $Ln_2O_x$, $Al_2O_3$, SrO and $TiO_2$, or their hydroxides or salts or the like, from which the oxides can be produced by heating, are formed by press or other methods into a predetermined shape, and then, the formed pieces are fired by heating to form into a desired shape.

More specifically, the dielectric ceramics is produced in a manner described below, for example. High-purity lanthanide oxide, aluminum oxide, strontium carbonate and titanium oxide, all in powdery form, are used as starting materials and mixed at a desired mixing proportion. Demineralized water, for example, is added to the mixed powder, and the powder undergoes wet-mixing and pulverizing by a mill using zirconia balls and the like for 10 to 30 hours until the average grain diameter of the mixed materials becomes 2.0 μm or less.

This mixture is dried and then calcinated for 2 to 10 hours at 1000 to 1300° C. Binder amounting to five parts by weight is added to the calcinated powder, which is granulated. The powder is formed into a desired shape by a desired forming means, such as a die-press, a cold hydraulic pressure press or an extruder, and then fired in the air atmosphere for 1 to 10 hours at 1500 to 1700° C. to obtain the dielectric ceramics.

Furthermore, the present invention also provides a dielectric resonator comprising the above-mentioned dielectric ceramic composition which is disposed between a pair of input and output terminals.

The dielectric resonator of the present invention comprises an input electrode 2 and an output electrode 3 connected to lead wires 20 and 30 respectively on both sides of a metal container 1, and a resonance block 4 formed of ceramics having the above-mentioned composition and disposed between the electrodes 2 and 3, just like the TE mode resonator shown in FIG. 1. In the TE mode dielectric resonator having this configuration, a microwave is input to the input electrode 2, the microwave is confined in the ceramic block 4 by reflection at the boundary between the ceramic block 4 and a free space 10 in the container 1, and causes resonance at a specific frequency. This signal causes electromagnetic coupling with the output electrode 3, and is output from the output electrode 3 via the lead wire 30.

The dielectric ceramic composition of the present invention is applied to coaxial resonators and strip line resonators, used in the TEM mode, dielectric ceramic resonators used in the TE or TM mode and other resonators.

In addition to the resonators, the dielectric ceramic composition of the present invention can also be used for MIC-use dielectric substrate materials, dielectric waveguide materials and laminated ceramic capacitors.

(Embodiment 1)

$La_2O_3$ selected as a lantanide oxide, aluminum oxide ($Al_2O_3$), strontium carbonate ($SrCO_3$) and titanium oxide ($TiO_2$), all in powdery form, were used as high-purity starting materials to obtain mixtures having the compositions indicated in Table 1. The mixed materials were further mixed and pulverized together with demineralized water by a wet mil for about 20 hours until the average grain diameter of the mixed materials became 2.0 μm or less.

The mixed materials may contain a total of not more than one weight percent of impurities, such as $ZrO_2$, $SiO_2$ and other rare earth elements depending on the type of mill balls and other various conditions.

After being dried, the mixture was calcinated for two hours at 1200° C., and granulated after addition of about five weight percent of binder. discs were formed as shaped compacts from the granular mixture at a pressure of about 1 ton/cm², and the compacts were fired in the air atmosphere for two hours at a temperature in the range of 1500 to 1700° C.

The ceramic discs thus obtained were ground on the surface and ultrasonically cleaned in acetone, and then dried for one hour at 80° C. The ceramic disc was provided to measure its dielectric constant $\in_r$, Q value and temperature coefficient $\tau_f$ of resonance frequency f at a measurement frequency in the range of 3.5 to 4.5 GHz by the cylindrical resonance technique.

The Q value was converted into the Q value at 1 GHz on basis of the relationship of Q value×measurement frequency f=constant, which was generally established for microwave dielectrics.

The temperature coefficient $\tau_f$ of resonance frequency was measured while the temperature was changed in the range of −40 to 85° C.

The results of these measurements are indicated in Table 1.

TABLE 1

| Sample No | La$_2$O$_3$ a | Al$_2$O$_3$ b | SrO c | TiO$_2$ d | deelectric constant εr | Q Value | τ f |
|---|---|---|---|---|---|---|---|
| 1 | 0.2233 | 0.2267 | 0.2731 | 0.2769 | 40 | 44000 | +3 |
| 2 | 0.2207 | 0.2303 | 0.2744 | 0.2746 | 42 | 41000 | +8 |
| 3 | 0.2195 | 0.2305 | 0.2751 | 0.2749 | 41 | 40000 | +11 |
| 4 | 0.2305 | 0.2195 | 0.2555 | 0.2945 | 40 | 41500 | +8 |
| 5 | 0.2200 | 0.2500 | 0.2550 | 0.2750 | 39 | 44400 | −2 |
| 6 | 0.2250 | 0.2250 | 0.2750 | 0.2750 | 39 | 50300 | +1 |
| 7 | 0.2200 | 0.2200 | 0.2905 | 0.2695 | 40 | 39000 | +4 |
| 8 | 0.2195 | 0.2195 | 0.2805 | 0.2805 | 37 | 42100 | −1 |
| 9 | 0.2195 | 0.2195 | 0.4610 | 0.1000 | 45 | 43300 | +3 |
| 10 | 0.3500 | 0.3500 | 0.1500 | 0.1500 | 30 | 61000 | −28 |
| 11 | 0.2900 | 0.3100 | 0.2000 | 0.2000 | 33 | 62000 | −26 |
| 12 | 0.4500 | 0.2850 | 0.1200 | 0.1450 | 38 | 42200 | −8 |
| 13 | 0.3250 | 0.4500 | 0.1050 | 0.1200 | 31 | 52500 | −22 |
| 14 | 0.4000 | 0.4000 | 0.1000 | 0.1000 | 30 | 48800 | −27 |
| 15 | 0.3555 | 0.2945 | 0.1500 | 0.2000 | 35 | 40000 | −8 |
| 16 | 0.2195 | 0.2195 | 0.1000 | 0.4610 | 35 | 37700 | +8 |
| 17 | 0.2200 | 0.2300 | 0.3500 | 0.2000 | 45 | 30100 | +18 |
| 18 | 0.2350 | 0.2195 | 0.2750 | 0.2705 | 38 | 49000 | −10 |
| 19 | 0.3100 | 0.3100 | 0.1900 | 0.1900 | 34 | 51800 | −20 |
| 20 | 0.2500 | 0.2500 | 0.2500 | 0.2500 | 36 | 51000 | −15 |
| 21 | 0.3300 | 0.2500 | 0.1500 | 0.2700 | 35 | 40100 | −9 |
| 22 | 0.2500 | 0.3000 | 0.3500 | 0.1000 | 33 | 38500 | −2 |
| 23 | 0.3050 | 0.3000 | 0.2450 | 0.1500 | 32 | 33300 | −11 |
| 24 | 0.3500 | 0.2750 | 0.2750 | 0.1000 | 31 | 25000 | −17 |
| 25 | 0.2850 | 0.2000 | 0.2570 | 0.2580 | 35 | 32300 | −3 |
| *26 | 0.5606 | 0.2194 | 0.1400 | 0.0800 | 17 | 9750 | −55 |
| *27 | 0.1460 | 0.1300 | 0.3600 | 0.3640 | 60 | 16000 | +100 |
| *28 | 0.1100 | 0.1100 | 0.3900 | 0.3900 | 57 | 18000 | +130 |
| *29 | 0.0960 | 0.1040 | 0.3500 | 0.4500 | 55 | 18500 | +91 |
| *30 | 0.2194 | 0.1050 | 0.5540 | 01216 | 68 | 11000 | +89 |
| *31 | 0.0790 | 0.0790 | 0.3900 | 0.4520 | 67 | 13500 | +75 |
| *32 | 0.5000 | 0.1550 | 0.1700 | 0.1750 | 19 | 6500 | −110 |
| *33 | 0.2400 | 0.4670 | 0.1450 | 0.1480 | 13 | 8100 | −98 |
| *34 | 0.1000 | 0.1000 | 0.2450 | 0.5550 | 47 | 9200 | +78 |
| *35 | 0.4000 | 0.4505 | 0.0595 | 0.0900 | 17 | 16500 | −61 |

Sample numbers marked with * are beyond the scope of the present invention.

As clearly indicated in Table 1, it has been found that the dielectric samples of the present invention have excellent dielectric characteristics: a dielectric constant of 30 or more, a Q value of 25000 or more (at 1 GHz) and a temperature coefficient $\tau_f$ in the range of −30 to +30 (ppm/° C.). On the other hand, dielectric samples beyond the scope of the present invention have a low dielectric constant or a low Q value, or an absolute value of $\tau_f$ exceeding 30 ppm/° C.

Furthermore, ceramic dielectric samples were formed in the same way while La of La$_2$O$_3$ in the compositions of samples 1, 4 and 8 indicated in Table 1 was replaced with other rare earth elements. These ceramic dielectric samples were subjected to the same dielectric tests. The results of the tests are indicated in Table 2.

TABLE 2

| Sample No | Actinide Ln | εr | Q Value | τ f | Remarks |
|---|---|---|---|---|---|
| 36 | Nd | 35 | 48000 | −16 | Sample 8 |
| 37 | 0.2 Nd · 0.8 La | 36 | 48900 | −15 | a 0.2500 |
| 38 | Ce | 36 | 45000 | −10 | b 0.2500 |
| 39 | 0.2 Ce · 0.8 La | 35 | 44500 | −12 | c 0.2500 |
| 40 | Pr | 32 | 43000 | 5 | d 0.2500 |
| 41 | 0.2 Pr · 0.8 La | 33 | 42100 | −6 | |
| 42 | Sm | 34 | 44000 | −11 | |
| 43 | 0.2 Sm · 0.8 La | 34 | 43500 | −12 | |
| 44 | Eu | 35 | 50000 | −8 | |
| 45 | 0.2 Eu · 0.8 La | 34 | 49500 | −8 | |
| 46 | Gd | 31 | 43500 | −7 | |
| 47 | 0.2 Gd · 0.8 La | 32 | 44700 | −5 | |
| 48 | Dy | 31 | 48500 | −2 | |
| 49 | 0.2 Dy · 0.8 La | 32 | 47200 | −1 | |
| 50 | Er | 30 | 41000 | −3 | |
| 51 | 0.2 Er · 0.8 La | 32 | 40000 | −5 | |
| 52 | Yb | 30 | 37500 | −5 | |
| 53 | 0.2 Yb · 0.8 La | 33 | 36000 | −7 | |
| 54 | Nd | 39 | 41000 | +7 | Sample 4 |
| 55 | 0.5 Nd · 0.5 La | 39 | 43000 | +6 | a 0.2305 |
| 56 | Sm | 38 | 390000 | +5 | b 0.2195 |
| 57 | 0.5 Sm · 0.5 La | 38 | 40500 | +4 | c 0.2555 |
| 58 | Dy | 36 | 40000 | +9 | d 0.2945 |
| 59 | 0.5 Dy · 0.5 La | 35 | 38000 | +5 | |
| 60 | 0.2 Nd · 0.2 Sm · 0.6 La | 36 | 38500 | +1 | Sample 1 |
| 61 | 0.2 Nd · 0.2 Dy · 0.6 La | 36 | 37000 | −1 | a 0.2233 |
| 62 | 0.2 Nd · 0.2 Pr · 0.6 La | 36 | 35500 | −3 | b 0.2195 |
| | | | | | c 0.2731 |
| 63 | 0.2 Sm · 0.2 Pr · 0.6 La | 34 | 36000 | −4 | d 0.2769 |

It has been found that the ceramic dielectrics wherein La$_2$O$_3$, a rare earth oxide, is replaced with other rare earth oxides have sufficient characteristics for practical use: a dielectric constant of 30 or more, a Q value of 25000 or more and an absolute value of $\tau_f$ of not more than 30 ppm/° C.

(Embodiment 2)

Next, MnO$_2$ was added to the major components of the composition of sample 8 in the above-mentioned TABLE 1 so that MnO$_2$ was contained in various amounts. A manganese compound such as MnCO$_3$ or the like which dissolves into MnO$_2$ by heating at high temperatures can be used as a starting material.

Sintered ceramic samples were then obtained just as in the case of Embodiment 1, and they were subjected to measurements of dielectric constant $\tau_r$, Q value and temperature coefficient $\tau_f$.

TABLE 3

| Sample No. | Main Component | MnO$_2$ Content (wt %) | εr | Q Value | τ f |
|---|---|---|---|---|---|
| 64 | 8 | 0.22 | 39 | 46300 | −2 |
| 65 | | 1.00 | 39 | 46700 | −2 |
| 66 | | 7.00 | 40 | 45500 | 0 |
| 67 | | 5.00 | 39 | 46100 | −1 |
| 68 | | 0.01 | 39 | 44900 | −2 |
| 69 | | 3.50 | 39 | 47100 | −2 |
| 70 | | 0.005 | 39 | 44400 | −2 |
| *71 | | 7.50 | 41 | 35500 | 2 |
| *72 | | 8.00 | 41 | 19000 | 5 |
| 73 | 36 | 0.01 | 36 | 48500 | −15 |
| 74 | | 1.00 | 37 | 51500 | −15 |
| 75 | | 5.00 | 37 | 54000 | −14 |
| 76 | | 7.00 | 37 | 49000 | −14 |
| *77 | | 8.00 | 38 | 24500 | −13 |
| 78 | 37 | 0.01 | 36 | 49900 | −14 |
| 79 | | 1.00 | 36 | 51000 | −13 |
| 80 | | 5.00 | 37 | 54000 | −13 |
| 81 | | 7.00 | 37 | 49200 | −12 |
| *82 | | 8.00 | 37 | 23100 | −12 |
| 83 | 42 | 0.01 | 35 | 45000 | −10 |
| 84 | | 1.00 | 35 | 47000 | −10 |
| 85 | | 5.00 | 36 | 49000 | −9 |
| 86 | | 7.00 | 36 | 44500 | −9 |
| *87 | | 8.00 | 36 | 23000 | −8 |
| 88 | 43 | 0.01 | 34 | 44500 | −11 |
| 89 | | 1.00 | 34 | 47000 | −11 |
| 90 | | 5.00 | 34 | 47500 | −10 |
| 91 | | 7.00 | 35 | 45100 | −10 |
| *92 | | 8.00 | 35 | 22000 | −9 |

TABLE 3-continued

| Sample No. | Main Component | MnO$_2$ Content (wt %) | $\epsilon$ r | Q Value | $\tau$ f |
|---|---|---|---|---|---|
| 93 | 48 | 0.01 | 31 | 49800 | −2 |
| 94 |  | 1.00 | 32 | 51200 | −1 |
| 95 |  | 5.00 | 32 | 52200 | +1 |
| 96 |  | 7.00 | 32 | 49200 | +3 |
| * 97 |  | 8.00 | 33 | 21600 | +3 |

Sample numbers marked with * are Sambeyond the scope of the present invention.

TABLE 4

| Sample No | Main Component | MnO$_2$ Content (wt %) | $\epsilon$ r | Q Value | $\tau$ f |
|---|---|---|---|---|---|
| 98 | 9 | 0.01 | 33 | 48100 | −1 |
| 99 |  | 1.00 | 33 | 49800 | 0 |
| 100 |  | 5.00 | 34 | 51250 | +1 |
| 101 |  | 7.00 | 33 | 52800 | +2 |
| * 102 |  | 8.00 | 33 | 20900 | +2 |
| 103 | 60 | 0.01 | 36 | 39000 | +1 |
| 104 |  | 1.00 | 36 | 41500 | +1 |
| 105 |  | 5.00 | 36 | 43050 | +2 |
| 106 |  | 7.00 | 37 | 40500 | +2 |
| * 107 |  | 8.00 | 37 | 24500 | +3 |
| 108 | 61 | 0.01 | 37 | 38000 | −1 |
| 109 |  | 1.00 | 37 | 39800 | −1 |
| 110 |  | 5.00 | 38 | 41200 | 0 |
| 111 |  | 7.00 | 39 | 39300 | +1 |
| * 112 |  | 8.00 | 39 | 22400 | +1 |

Sample numbers marked with * are beyond the scope of the present invention.

The results are indicated in Tables 3 and 4. It has been found that the Q values of the samples containing not more than 7.0 parts by weight of MnO$_2$ can be improved without changing $\tau_r$ and $\tau_f$. However, As the content of MnO$_2$ exceeds 7.0 parts by weight, the Q value lowers extremely. Therefore, the content of MnO$_2$ should not be more than 7.0 parts by weight.

As detailed above, in accordance with the present invention, a dielectric ceramic composition having a constant composition containing at least lanthanide element (Ln), Al, Sr and Ti as metal element has a high dielectric constant and a high Q value in high frequency ranges, and also has a temperature coefficient $\tau_f$ of resonance frequency capable of being controlled stably in a small range. Furthermore, in accordance with the present invention, the Q value can be further improved by adding MnO$_2$ to the above-mentioned major components.

USABILITY IN INDUSTRY

The dielectric ceramic composition in accordance with the present invention can be produced and used in the industrial field of electronic materials and components, and can favorably be applied to resonator materials, MIC-use dielectric substrate materials, dielectric waveguides, dielectric antennas and other various electronic components used in the microwave and milimeter wave ranges for use in car phones, cordless phones, personal radios, satellite broadcast receivers and the like, for example.

I claim:

1. A dielectric ceramic composition containing at least lanthanide Ln, Al, Sr and Ti as metal elements, and having composition represented by the following composition formula;

$$aLn_2O_x \cdot bAl_2O_3 \cdot cSrO \cdot dTiO_2$$

wherein a, b, c, d and x are confined as follows in mole ratio:

$0.2194 < a \leq 0.4500$ $0.2194 < b \leq 0.4500$ $0.1000 \leq c \leq 0.4610$ $0.1000 \leq d \leq 0.4610$ $3 \leq x \leq 4$, and a+b+c+d=1.

2. A dielectric ceramic composition containing at least lanthanide Ln, Al, Sr and Ti as metal elements, and further containing not more than 7.0 parts by weight of Mn in terms of MnO$_2$ to 100 parts by weight of major components having composition represented by the following formula;

$$aLn_2O_x \cdot bAl_2O_3 \cdot cSrO \cdot dTiO_2$$

wherein a, b, c, d and x are confined as follows in mole ratio:

$0.2194 < a \leq 0.4500$ $0.2194 < b \leq 0.4500$ $0.1000 \leq c \leq 0.4610$ $0.1000 \leq d \leq 0.4610$ $3 \leq x \leq 4$, and a+b+c+d=1.

3. A dielectric ceramic composition according to claim 1 or 2, wherein lanthanide Ln is La.

4. A dielectric resonator comprising a resonating medium formed from said dielectric ceramic composition according to claim 1 or 2 into a predetermined shape and a pair of input and output electrodes disposed on both sides of said resonating medium, wherein a high-frequency signal is applied across said input and output electrodes to resonate said resonator at a desired frequency.

* * * * *